United States Patent [19]

Davie et al.

[11] 4,144,539

[45] Mar. 13, 1979

[54] FEEDBACK CONTROL FOR LASER DISCHARGE SYSTEM

[75] Inventors: Neil R. Davie, Larimer County; Joseph C. Lambiotte, Boulder County, both of Colo.

[73] Assignee: International Business Machines Corporation, Armonk, N.Y.

[21] Appl. No.: 796,633

[22] Filed: May 13, 1977

Related U.S. Application Data

[63] Continuation-in-part of Ser. No. 643,893, Dec. 23, 1975, abandoned.

[51] Int. Cl.² ............................................. G01D 15/14
[52] U.S. Cl. ...................................... 346/160; 355/14; 346/108
[58] Field of Search ............ 346/160, 153, 159, 33 M, 346/108; 331/94.5 S; 355/3 R, 14; 178/6.3 R; 358/300

[56] References Cited

U.S. PATENT DOCUMENTS

| | | | |
|---|---|---|---|
| 3,154,371 | 10/1964 | Johnson | 346/160 |
| 3,321,307 | 5/1967 | Urbach | 346/160 |
| 3,358,081 | 12/1967 | Young | 346/160 |
| 3,395,367 | 7/1968 | Bell et al. | 331/94.5 S |
| 3,396,235 | 8/1968 | Button | 346/160 |
| 3,396,401 | 8/1968 | Nonomura | 346/160 |
| 3,493,754 | 2/1970 | Black | 250/83.3 |
| 3,743,405 | 7/1973 | Morse | 355/3 R |
| 3,811,009 | 5/1974 | Fukumoto | 178/6.7 |
| 3,898,627 | 8/1975 | Hooker et al. | 346/108 |

Primary Examiner—Jay P. Lucas
Attorney, Agent, or Firm—Joscelyn G. Cockburn

[57] ABSTRACT

In a xerographic printer wherein an acousto-optic modulator is used to derive a deflected first order beam of electromagnetic power which raster scans a charged photoconductor to leave a selectively discharged latent image area bordered by a discharged border area; power contents of said first order beam is maintained constant by adjusting the efficiency of the acousto-optic modulator with a closed loop electrical control system. The efficiency of the acousto-optic modulator is adjusted only when the beam is scanning the border area of the photoconductor.

16 Claims, 9 Drawing Figures

FEEDBACK CONTROL FOR LASER DISCHARGE SYSTEM

CROSS REFERENCES TO RELATED APPLICATIONS AND PATENTS

This application is a Continuation-In-Part of Application Ser. No. 643,893, filed Dec. 23, 1975 and now abandoned.

The copending application of R. R. Schomburg, Ser. No. 506,806, filed Sept. 17, 1974, and commonly assigned is incorporated herein by reference. The Schomburg application is a continuation of Application Ser. No. 408,980, filed Oct. 23, 1973, now abandoned.

This copending application describes an optical printer character generator wherein a character generation control register independently stores, for each row of text to be generated, the order position of an alphanumeric character being generated and the remaining number of raster scans required to complete generation of the character. This control register enables the generation of symbols, that are allotted different relative widths, by an optical printer having a modulated light spot that scans the entire length of a page in the direction normal to the writing lines on the page. The control register also enables the text which is assembled in a page memory to be generated in reading lines of text that extend either parallel or normal to the direction of light spots scanning by selecting alternate page memory access sequences. By the use of "white space" indicating control codes in combination with the control register of this copending application, it is possible to materially reduce the size of memory required to store a page of text.

U.S. Pat. No. 3,898,627 issued on Aug. 5, 1975, to R. W. Hooker et al is incorporated herein by reference. This patent describes a serializing buffer for use, for example, in the structure described in the above mentioned copending application, Ser. No. 506,806, to control the conversion of variable length, parallel character identifying binary data words into an unbroken serial binary bit stream which is operable to control the laser beam deflection by way of an acousto-optic modulator, the binary state of the bit defining the light/dark contrast pattern required for generating printed pages of an electrophotographic printer.

U.S. Pat. No. 3,835,249 issued on Sept. 10, 1974, to A. J. Dattilo et al, is incorporated herein by reference. This patent discloses a synchronizing system for a scanning laser beam which selectively discharges a photoconductor in accordance with beam modulation achieved by a beam modulator. Specifically, synchronization is achieved by a beam splitter which directs a portion of a laser beam through an optical grating to an elliptical mirror. Reflection from the mirror impacts a photodetector. This photodetector generates a clock which is operable to gate a serial binary bit stream to the modulator, thus synchronizing the binary data flow to the beam sweeping the photoconductor.

BACKGROUND OF THE INVENTION

1. Field of the Invention

This invention relates to the field of electrophotographic, and more particularly, to an electrophotographic apparatus wherein a monochromatic light beam is used to print a document from an electrical data defined image.

2. Prior Art

It is well known in the prior art to use a monochromatic light beam to scan a photosensitive material for facsimile recording and generation of recorded data. Prior devices have utilized a laser light source to generate the monochromatic light beam. The light beam is then intercepted by an acousto-optic light deflector which deflects the beam into zero order, first order and higher order beams in accordance with a phenomenon called RomanNath scattering and Brillouin scattering. One of the optical higher order beams, (usually the first order beam) designated as the working beam, is used for facsimile recording on a photosensitive material. For control purposes, the acousto-optic light deflector is driven by a facsimile signal modulator. When the above device and/or method is used in an electrophotographic device, the photosensitive material is toned, developed and the toned image is then transferred to a receiving media.

Although the prior art devices function satisfactorily for the intended purpose, the systems have several problems and drawbacks which render them unacceptable when used in an electrophotographic device. Probably the most pressing drawback with the prior art systems is the inability to maintain the power level of the working beam (i.e., the beam which intercepts the photosensitive material) constant. As is well known to those skilled in the art, there is a strong relationship between the power contents of the working beam and the quality of a copy (i.e., the output) which is derived from a latent image on the photosensitive material. Generally, if the power contents of the working beam remains constant, the photosensitive material will be evenly discharged and the quality of a subsequent copy (i.e., the output) will be acceptable. Conversely, if the power contents of the working beam is not constant then the photosensitive material will be unevenly discharged and the quality of the subsequent copy (i.e., the output) will be unacceptable.

Several methods and devices have been practiced in the prior art to maintain a constant power level in the working beam. One of these methods is to insure that the power supplies which are driving the laser and the facsimile generator are maintained at a constant level. However, due to degradation (over a period of time) in the components of the laser and the facsimile generator, even if the power from the power supplies is constant, the output from the laser and facsimile generator varies. So, in order for the power supply output to maintain power at a constant level, (i.e., without drifting) expensive components and expensive circuits are required for its design.

Another approach which has been used by the prior art to solve the aforementioned problem is to stabilize the laser. Several exotic and expensive methods, such as baking, etc., have been tried without avail. The lack of success stems from the fact that the laser and its components deteriorate with time while the method used to stabilize the laser is static.

Stated another way, the laser beam varies dynamically due to components deterioration etc. However, the methods which are used to stabilize the laser beam are non dynamic.

Still another approach which is practiced in the prior art to solve the aforementioned problem, is to derive a control signal from a higher order non working beam and use said derived signal to control the facsimile generator. Although in some cases this method was a significant improvement over the prior art, it is affected by problems.

The first problem is that although the beam whose power level is to be maintained constant is the working beam, the beam whose power is sensed and is used to control the facsimile generator so as to modify the power level or power contents of said working beam is a beam other than the working beam. With this method of control, it is extremely difficult, if not impossible, to be certain that the power level or power contents of the working beam is constant.

Another problem with the prior art systems is that the power level or power contents of beams beyond the first order beam (i.e., higher order beams) is extremely low for sensing and, therefore, requires extremely sensitive and expensive electronic circuits to control the facsimile generator.

Still another problem is that the power content of the working beam is adjusted continuously. As is well known to those skilled in the art, in an electrophotographic machine the laser beam is used to selectively discharge incremental areas on the photosensitive material so as to print a latent image of an original. During the discharge of these incremental areas, it is important that the power content of the working beam remain constant. However, with the prior scheme wherein the working beam is continuously adjusted, the power level of the beam is always in a state of flux (i.e., continuous change) during incremental discharge of the photosensitive material. With this defect (i.e., the continuous adjustment of power level of the working beam), it is possible that the quality of the copies derived from a device embodying the described scheme is less than acceptable.

SUMMARY OF THE INVENTION

The present invention overcomes the aforementioned drawbacks, in the prior art, by means of feedback control circuitry which ensures that the power level of the first order working beam (i.e., the beam which is used to print a latent image on a working area of a photoconductor) remains constant.

More specifically, the invention discloses an electrophotographic device wherein a monochromatic light beam is generated by a laser source. The light beam is intercepted by an acousto-optic modulator which (alternately) splits the beam into a zero order beam and a first order working beam. The zero order beam is blocked while the first order working beam is directed via a focusing system and a scanning means to intercept the surface of a photoconductor which is divided into working and non working areas.

In one feature of the invention, a beam splitter or equivalent means is positioned in the path of the first order beam so as to split said first order beam into two paths: a utilization path and a power control path. The portion of the first order beam which traverses the utilization path is directed via the aforementioned focusing system and scanning means to intercept and scan the photoconductor surface. At the photoconductor, the first order beam is on continuously for the time period when said first order beam is scanning the non working area of said photoconductor. Conversely, the first order beam is on selectively when the beam scans the working area of the photoconductor.

By controlling the first order beam in the aforementioned manner, the non working area of the photoconductor which borders the working area is continuously discharged or erased when the first order beam is on continuously while the working area is selectively discharged (i.e., discharged in accordance with the contents of the data to be written in the working area of the photoconductor) when the beam is on selectively.

In another feature of the invention, a sensor means is positioned to intercept and sense the power level of the first order beam which is diverted along the power control path. The sensor outputs a signal whose voltage level is indicative of the power level of said first order beam. The outputted signal is then compared with a predetermined reference signal. Whenever there is discrepancy between the two signals the efficiency of the acousto-optic modulator is adjusted which, in turn, adjusts the power level of the first order beam.

In still another feature of the invention, means are provided to enable the adjustment feature of the invention only when the first order beam is scanning the non working area of the photoconductor.

The foregoing and other features and advantages of the invention will be apparent from the following more particular description of the preferred embodiments of the invention as illustrated in the accompanying drawings.

DESCRIPTION OF THE PREFERRED EMBODIMENT

In the subsequent detailed discussion, like elements will be designated by common numbers.

As used in this application, the term "Working Area" means the section or surface of the photoconductor which is used to print a latent image of an original page. The working area is the area which coincides with a sheet of copy paper at the transfer station. When the laser beam is scanning the working area of the photoconductor, the laser beam is "ON" and/or "OFF" selectively depending on the contents of the original page.

As used in this application, the term "Nonworking Area" means the section or surface area of the photoconductor which borders the "Working Area". When the laser beam is scanning the nonworking area of the photoconductor, it is on continuously.

Figure 1:
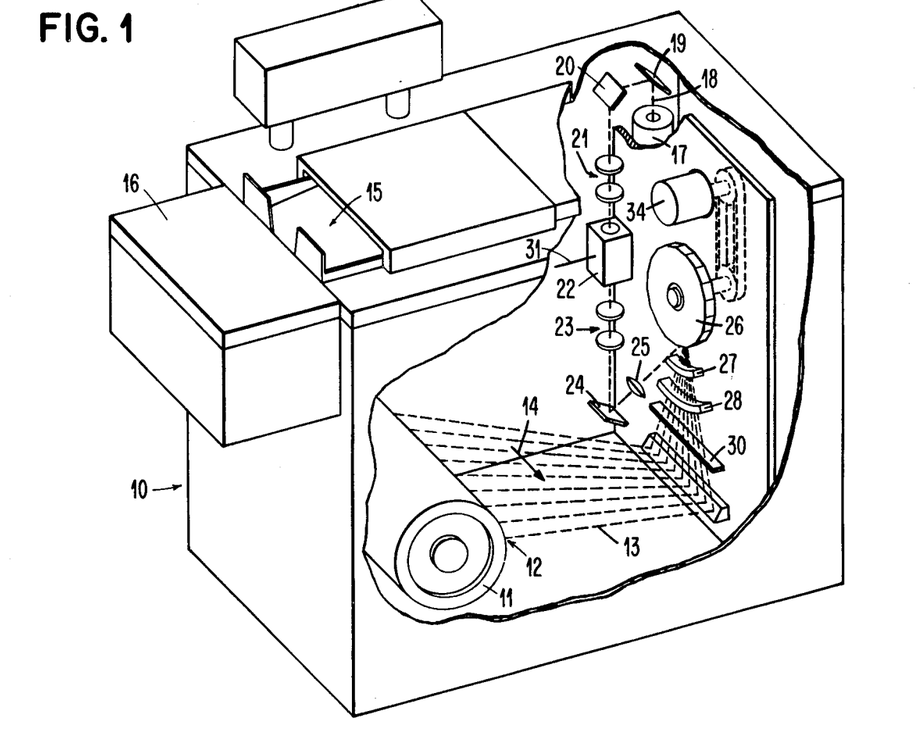
FIG. 1 is a front perspective view of an electrophotogrphic apparatus embodying the present invention, wherein a portion of the apparatus housing is broken away to better show the beam scanning mechanism, and wherein the illumination apparatus which causes a reflected image of an original document to be reflected in line scan fashion onto the drum photoconductor has been eliminated to simplify the showing.
Figure 2:
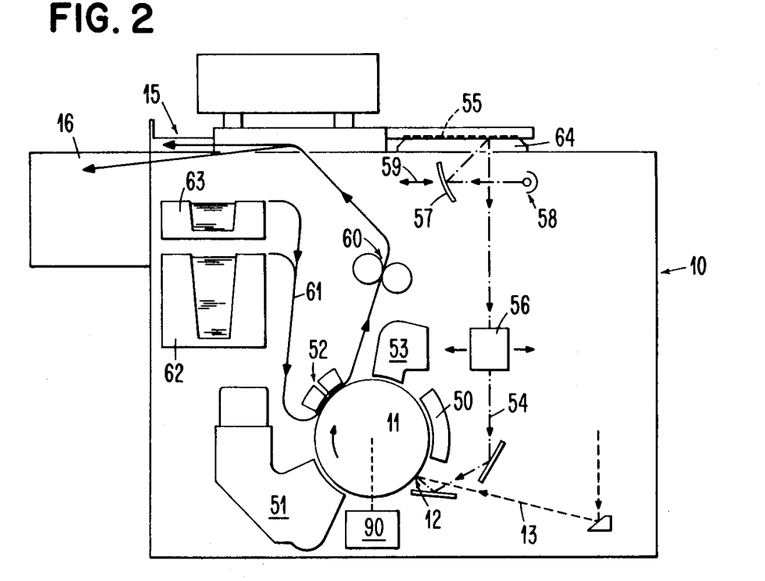
FIG. 2 is a front view of the apparatus of FIG. 1, showing the scanning optical mechanism which is operable to reflect an original document to the photoconductor.

FIGS. 1 and 2 show an electrophotographic apparatus 10. The apparatus has the capability of operating in either a copy mode or a print mode. However, since the inventive freature of this invention is chiefly concerned with the apparatus while operating in the print mode, the copy mode operation will not be discussed in detail.

Returning to FIG. 2, apparatus 10 includes a photoconductor drum 11 providing an image receiving photoconductor conductive surface. Drum 11 is rotated successively past a charging station 50, an exposure station 12, an inter image erase station (not shown), a synchronizing station 90, a development station 51, a transfer station 52 and a cleaning station 53. At the exposure station, uniform electrical charge which was applied to the photoconductor at the charging station is selectively dissipated. In the copy mode, selective dissipation or discharge is accomplished by FIG. 2's reflected footprint of light 54, and in the print mode, selective dissipation is accomplished by a binary data signal, i.e., on/off, light beam 13 that traverses path 14 (see FIG. 1) extending parallel to the drum's axis of rotation.

Footprint 54 extends a substantial portion of drum 11 and is operable to discharge the working area of the photoconductor in accordance with the reflectance characteristic of an original document 55. Document 55 is line scanned by movable lens 56 and reflector 57. Light source 58 cooperates with reflector 57 to illuminate the original document with a footprint of light, normal to scan direction 59. Document 55 is placed on the document glass with its length dimension normal to scan direction 59. The area of photoconductor drum 11 which is line scanned by this reflected footprint is defined as the photoconductor's working area, i.e., it is the area which contains the reflected image to be reproduced. The photoconductor area bordering this working area is referred to as the nonworking area and is scanned and discharged by a dual use laser beam.

This laser beam is identified by reference number 13 in FIGS. 1 and 2. Selective photoconductor exposure by beam 13 generates binary elements of an electrostatic latent image consisting of discharged white or background areas and charged image areas in the working area of the photoconductor. Likewise, continuous photoconductor exposure occurs when beam 13 is traversing the nonworking areas of photoconductor 11.

The photoconductor's latent image, in the print mode, is presented to development station 51 (FIG. 2) where colored thermoplastic resin powder or toner is selectively deposited on the charged image areas. Thereafter, the developed image is transferred to a paper support sheet by electrostatic force at transfer station 52. The printed sheet is then passed through a fixing station 60 in the form of a hot roll fuser, where heat or other suitable means temporarily liquifies the resin toner, causing it to adhere to the sheet and to form a permanent image. The sheet is then delivered to exit pocket or tray 15, or to bin 16 where it can be removed. Any toner powder remaining on the photoconductor, as it leaves the transfer station, is cleaned at the cleaning station prior to recharging of the photoconductor for further operation. Paper is selectively supplied to sheet path 61 from a primary or a secondary bin 62 or 63 wherein stacks of cut sheets are stored with their length dimension oriented normal to the direction of sheet feed. These two bins allow the use of sheets of different length, and allow manual selection of a sheet length most nearly corresponding to the length of original document 55.

Drum photoconductor 11 may be of the type wherein a flexible photoconductor web is carried on a rigid metallic surface of a drum. The photoconductor is stored in flexible strip form on supply and takeup rolls located within the drum's interior. The portion of the photoconductor extending between the two rolls encircles the drum and is active in the electrophotographic process. To change the active photoconductor portion, a length of the photoconductor is advanced from the supply roll to the takeup roll. The drum's surface includes an axially extending slot whereat the photoconductor enters and exits the drum's interior. This slot is closed by a seal strip. U.S. Pat. No 3,588,242, issued to R. A. Berlier et al is an example of such a structure.

Once the working area of the photoconductor is selectively discharged at exposure station 52, the nonworking area is next discharged at the interimage erase area. The function and operation of the interimage erase station is well known in the electrophotographic art and will not be discussed in detail. Suffice it to say that the interimage erase station includes erase lamps and/or lamps which are turned on to erase the nonworking area of the photoconductor. A more detailed discussion of the interimage erase station with control means is given in IBM Technical Disclosure Bulletin Vol. 19, No. 7, December, 1976 pages 2448–2450 and IBM Technical Disclosure Bulletin, Vol. 19, No. 2, July 1976, pages 393–394.

The sychronizing station (90) which will be discussed in greater detail hereinafter operates to synchronize various copying functions with the angular position of the photoconductor. Stated another way, the synchronizing station monitors the angular position of the photoconductor drum and output control pulses which are used to initiate and/or terminate various operations which are necessary for reproducing acceptable copies. For example, the synchronizing station outputs control pulses which are used to turn on and/or turn off the interimage erase lamps. Of special concern to the present invention is that the synchronizing station generates control pulses which activate the energy adjustment circuitry of the present invention.

Details of an electrophotographic apparatus are well known to those skilled in the art and form no part of this invention. It is to be understood that a variety of techniques exist for performing the various functions identified above.

Light beam 13 is preferably generated from a radiant source of high intensity coherent light, such as a continuous mode helium-neon laser 17 (FIG. 1) that projects laser beam 18 along an optical path through mirrors 19 and 20, compression optics 21, binary beam control electro-optic laser beam modulator 22, expansion optics 23, mirror 24, lens 25, rotating scan mirror 26, lens 27, a projection lens 28, a beam splitting partial mirror 29 (shown in FIG. 4) and beam blocking knife edge 30 to the photoconductor drum. Modulator 22 is an acousto-optic Bragg effect device known to those skilled in the art. Modulator 22 responds to the binary state (1 or 0) of the electrical information bit on its input line 31 to thereby emit beam 18 in either of two closely adjacent but slightly different output paths 32 or 33; (see FIG. 4). If beam 18 is emitted along output path 33, it will ultimately be directed past knife edge 30 and will strike the photoconductor surface as beam 13 (FIG. 1) to discharge the photoconductor and thereby ultimately cause white background area or a white dot to be produced on the copy sheet. Beam 13 is called the first order working beam. Light emitted along path 32 (known as the zero order beam) is intercepted by knife edge 30 and thus does not strike the photoconductor. The resulting undischarged photoconductor surface will develop a toned image at the developing station to form part of the colored image area on the copy sheet.

The tilt correction optics of FIG. 1, comprising lenses 25 and 27, is of the type described in U.S. Pat. No. 3,750,189, issued to J. M. Fleischer.

Scan mirror 26 receives the laser beam along both paths 32 and 33 (FIG. 4) and redirects the beam toward knife edge 30. Mirror 26 is configured as a regular polygon and is driven by motor 34 at a substantially constant speed that is chosen with regard to the rotational speed of drum 11 and the size of beam 13, such that individual scanning strokes of beam 13 traverse immediately adjacent areas on the photoconductor surface to provide a full surface exposing raster.

Figure 4:
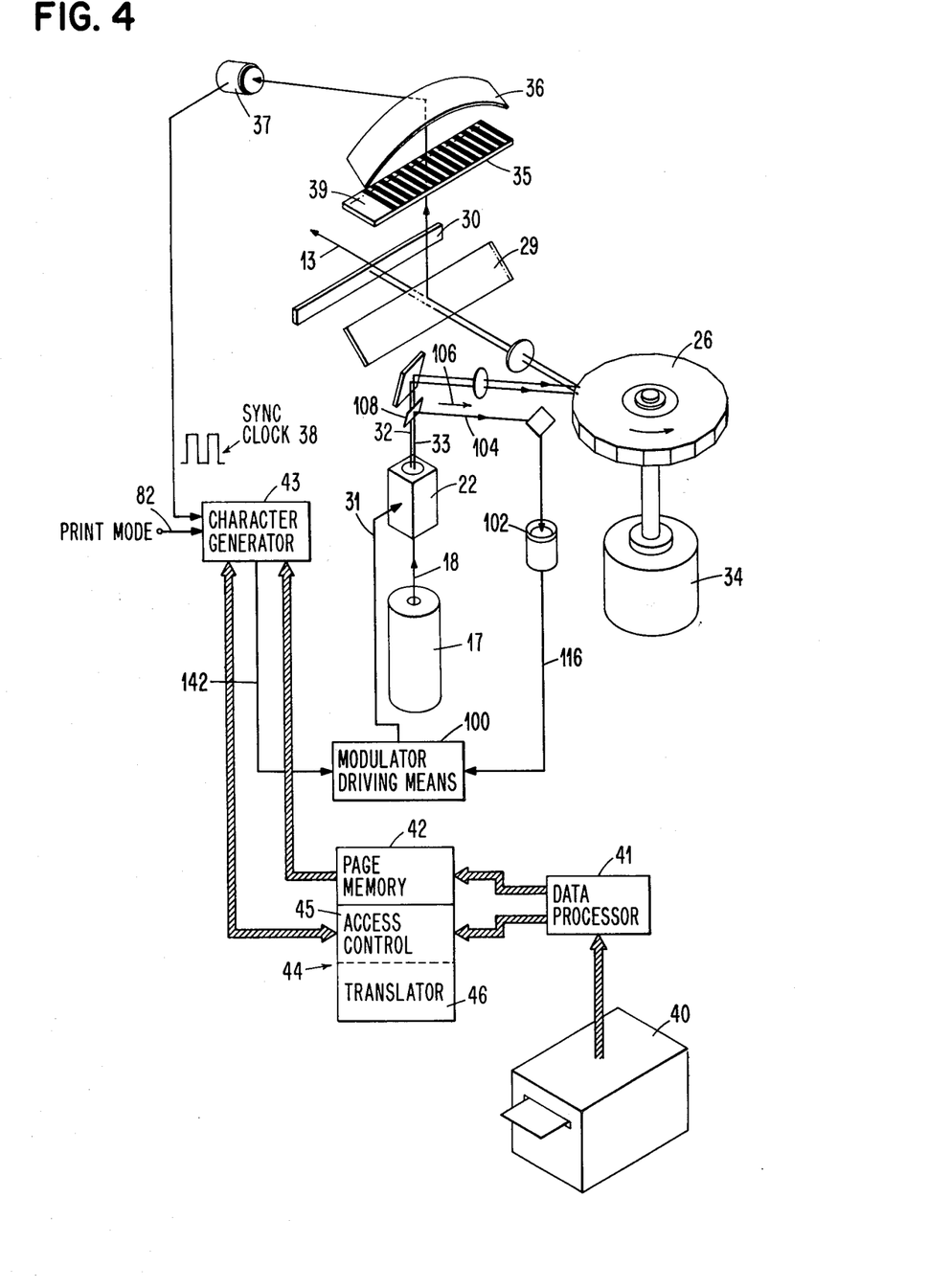
FIG. 4 is a diagrammatic view showing the electronic organization of FIG. 1's beam scanning printer, having a character generator constructed in accordance with the teachings of the above mentioned copending application, and also having a serializing buffer constructed in accordance with the teachings of above mentioned U.S. Pat. No. 3,898,627.

With reference to FIG. 4, means for synchronizing the first order beam when emerging from electro-optic modulator 22 and the point of incident of said beam on the photoconductor is shown. Basically beam splitting mirror 29 intercepts a fraction of the laser beam along both paths 32 and 33, as the beam is moved through its scanning motion by mirror 26, and diverts this fraction through optical grating 35 to elliptical mirror 36 by which the light is reflected to photodetector 37 positioned at one foci of mirror 36. The other foci of mirror 36 is located at the apparent source of the scanned rays which is slightly behind the scan mirror 26, and the optical geometry of the system is selected such that grating 35 is positioned to be equivalently located relative to exposure station 12 (FIG. 2). Photodetector 37 thus creates a train of clocking pulses 38, i.e., a read clock, that is a direct measure of the scanning movement (i.e., the point of incident) of the laser beam relative to the photoconductor. Conveniently, the pulses produced at photodetector 37 occur at the same rate that image elements or dots are to be defined by modulator 22, thereby enabling photodetector 37 to directly generate a gating or read clock signal for control of modulator 22. A continuous opaque portion 39 of grating 35 is provided to enable detection of the completion of each raster scan.

The above described means, including grating 35, which is operable to detect the position of the scanning laser beam, and thus clock the serial binary data stream into modulator 22, is of the type described in U.S. Pat. No. 3,835,249, issued to A. J. Dattilo et al and assigned to the assignee of the present invention.

By way of example, the dot density of a scan along path 14 (FIG. 1), to thereby generate a columnar segment, may be 240 dots per inch, thereby requiring a grating 35 having 120 opaque lines per inch. The orthogonal dot density, measured along the circumferential direction of drum 11, may also be 240 dots per inch. photoconductor source of electrical page text data, such as derived, for example, from a magnetic card or tape reading device 40, delivers the page text data image to be printed to data processing apparatus 41. In this manner, the text data is assembled and stored in page memory 42. Each character or symbol to be printed, as well as the spaces to be inserted between characters, are stored in page memory 42 at individual memory addresses which are, in turn, associated with the writing lines of the page and with the order position of the character within the writing line.

Once the text has been assembled in page memory 42, character generator 43 operates to provide the necessary binary dot pattern control of modulator 22 in order to reproduce a visual image of the page text. In addition to page memory 42, both data processor 41 and character generator 43 have access to an additional memory 44. This additional memory includes a page memory address control register 45 and a reference address and escapement value table or translator 46.

For a more complete description of FIG. 4's electronic organization, reference may be made to copending application Ser. No. 506,806, and U.S. Pat. No. 3,898,627.

Figure 5:
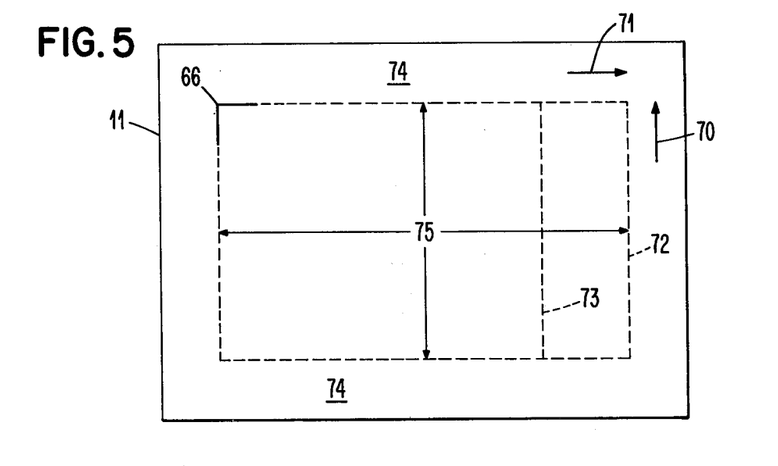
FIG. 5 is a view of FIG. 1's drum photoconductor "unrolled", to thereby facilitate an explanation of the relationship of the photoconductor's working area, as defined by the size copy paper currently in use, and the manner in which the scanning laser beam cooperates with the photoconductor.

With reference to FIG. 5, this figure shows the photoconductor of drum 11 "unrolled" to a flat state with reference corner 66. Only one working area, defined by broken line 72 and reference corner 66, is shown in this figure. The direction of photoconductor movement is indicated by arrow 70, and the direction of laser scan is indicated by arrow 71. Rectangular dotted outline 72 represents the photoconductor's area which will be contiguous with a sheet of paper supplied to FIG. 2's transfer station 52 from either of the bins 62 or 63. Broken line 73 represents a shorter length sheet of paper supplied, for example, from secondary bin 63. In any event, the area bounded by broken line 72, and including reference corner 66, is the photoconductor's working area (i.e., it is the area that contains the latent image of the document written by the working beam (first order beam) for reproduction. When the working beam is operating within the working area it is on selectively, i.e., under the control of the data stream on terminal 31. Since the entire photoconductor is charged at FIG. 2's charging station 50, the photo conductor area 74 which borders working area 72 and is referred to as the border or nonworking area must be discharged prior to the photoconductor passing through FIG. 2's developer 51.

Figure 8:
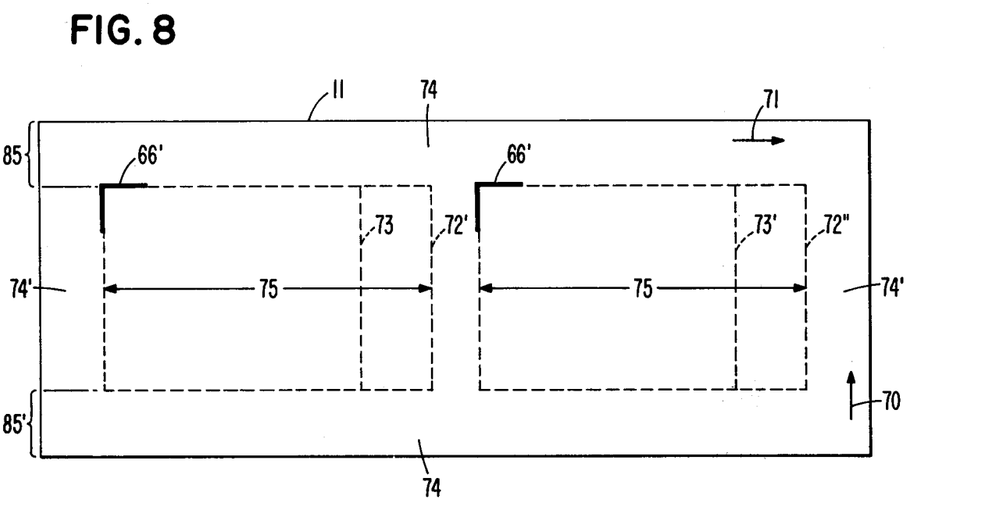
FIG. 8 depicts an alternate method for arranging the working area on the photoconductor surface.

FIG. 8 depicts an alternate method for arranging the working area on the photoconductor surface. In this embodiment two working areas, defined by broken lines 72', 72" and reference corners 66' and 66" respectively, are shown. With this arrangement, two copies are reproduced for each drum revolution.

On conventional electrophotographic apparatus, the nonworking area of the photoconductor is discharged by the lamp and/or lamps of the interimage erase station.

An alternative method for erasing the nonworking area of the photoconductor is to use the laser beam for erasing the nonworking area. Concurrently, with the erasing function the power contents of the beam are adjusted to a predetermined value.

In order to erase the nonworking area of the photoconductor and for adjusting the power contents of the working beam, it is necessary to determine the timer period when the working beam is on continuously and/or scanning the nonworking area of the photoconductor. This period is determined by the angular position of the drum as identified by synchronizing means 90 (FIG. 2). Synchronizing means 90 includes an emitter wheel and emitter wheel sensors combination. The emitter wheel is a metal disc with one or more rings of magnetic material mounted to it. The metal disc is seated on the shaft of the photoconductor drum and rotates with the drum. Lugs on the disc fit into holes cut in the magnetic ring. The lugs are arranged to identify the beginning and end of each working area on the photoconductor.

The emitter wheel sensor is an electronic switching device, preferably a Hall Effect Device, which reacts to a magnetic field. The sensor is situated in a fixed position relative to the rotating emitter wheel. A magnetic field is present around each lug which causes the sensor to conduct as the emitter wheel rotates and a lug aligns with the sensor. The signal which is outputted from the sensor is used to control the circuitry which adjusts the energy contents of the working beam.

In an alternate embodiment the synchronizing means is a LED/phototransistor block positioned relative to an optical disc which is seated on the shaft of the photoconductor drum and rotates in a manner similar to the previously described emitter wheel.

In another alternative embodiment the nonworking area of the photoconductor was determined by using a mini computer together with the appropriate program. Of course, it is within the skill of the art to design other synchronizing means without deviating from the scope of the present invention.

Referring again to FIGS. 1, 2 and 4, in order to obtain a satisfactory toned image from transfer station 52, the power content of working beam 13, which generates the latent image on working area 75, must be maintained at a constant power level. To assure the constant power level for beam 13, the output from character generator 43 is fed into modulator driving means 100 which in turn outputs a signal on terminal 31 for driving acousto-optic (A/O) modulator 22. Also beam splitter means 108 is positioned within the path of first order working beam 33 to split said beam into power control beam 104 which traverses power control path 106 and beam 13, hereinafter called utilization scanning beam 13. Light power sensor 102 intercepts power control beam 104 and outputs a signal on terminal 116 indicative of the power contents of said power control beam 104. As will be explained subsequently, light power sensor 102 is only operable when working beam 13 is on continuously (i.e., scanning the nonworking area of the photoconductor).

Figure 3:
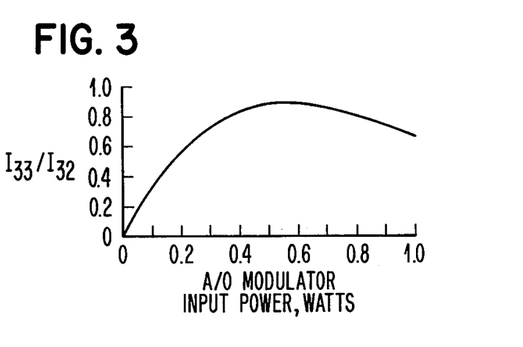
FIG. 3 is a graph demonstrating the relationship between input power to the A/O modulator and the amount of said power which is available in the first order beam.

Referring now to FIG. 3, a power diagram depicting the relationship between A/O modulator input power and a ratio ($I_{33}I_{32}$), which is the ratio of beam power deflected into the first order working beam ($I_{33}$) to total available power output in the zero order position beam ($I_{32}$), is shown. In FIG. 4, $I_{33}$ is equivalent to beam 33 which is also the first order working beam. Likewise, $I_{32}$ is equivalent to beam 32 which is also the zero order nonworking beam. By adjusting the R. F. power input, to A/O modulator 22, via modulator driving means 100 between the approximate range of from 0.1 to 0.5 watts, the power contents or beam intensity of working beam 33 is controlled.

Figure 6:
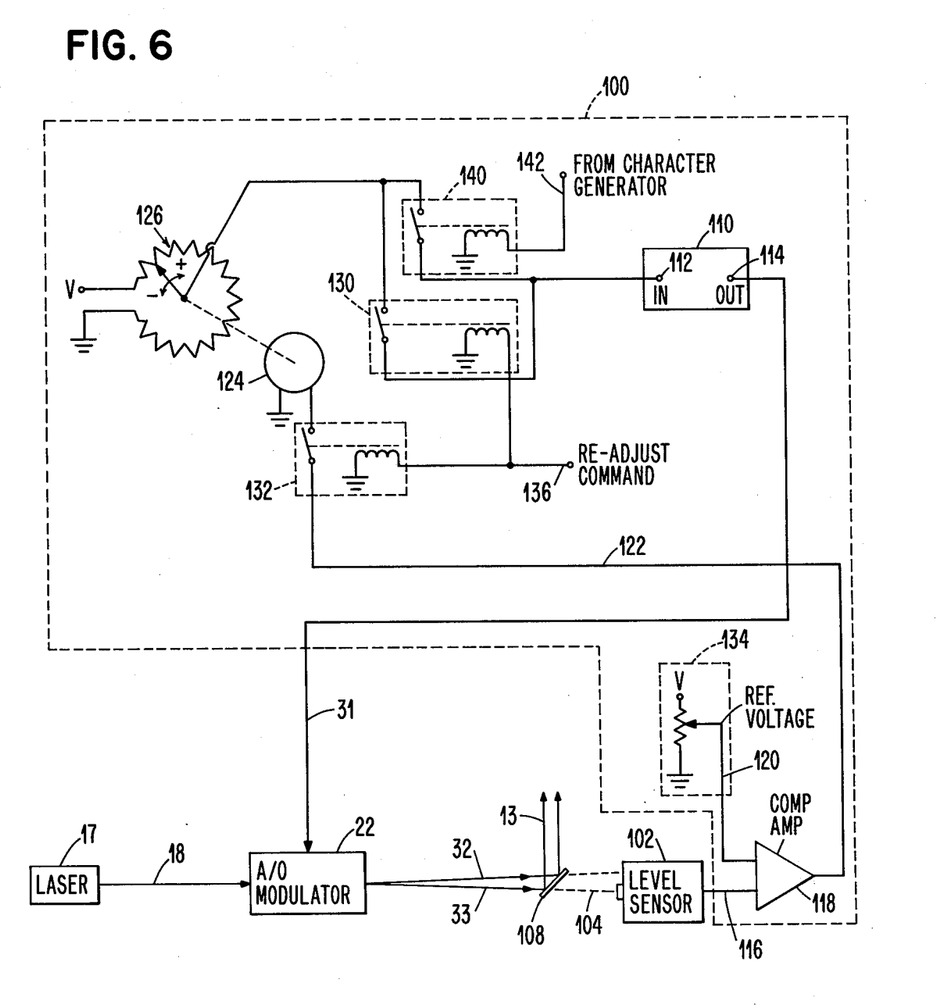
FIG. 6 depicts the preferred embodiment of a circuit which is used for adjusting the power level of the working order beam.

Referring not to FIG. 6, the circuitry of modulator driving means 100 together with A/O modulator 22, laser 17, light power sensor 102 and beam splitter 108 is shown in block diagram form.

The main purpose of the circuitry as depicted in FIG. 6 is to ensure that the power contents of utilization scanning beam 13 is maintained at a predetermined level when said utilization scanning beam is scanning working area 75 (FIGS. 5 and 8) of photoconductor 11 (FIG. 1).

Still referring to FIG. 6, modulator driving means 100 comprises modulator driver 110. Modulator driver 110 has input terminal 112 and output terminal 114. The output signal from terminal 114 appears on terminal 31 and is used for driving A/O modulator 22. As was explained previously, the efficiency of A/O modulator 22 can be adjusted by varying the input voltage on terminal 112 of modulator driver 110. Although modulator driver 110 can be any conventional driver which outputs an 80 MHz signal on terminal 31 in the preferred embodiment of this invention, a Data-light Model DLM-12 driver was used. It should be kept in mind that only the amplitude of the signal on terminal 31 varies. The frequency of the signal remains constant, for example, 80 MHz. As was stated previously, as the amplitude of the signal on terminal 31 varies, the power contents of utilization scanning beam 13 also varies. In order to maintain the power contents of said beam 13 at a constant predetermined level, beam splitting means 108 is positioned within first order beam path 33. The portion of the beam which is diverted is called power control beam 104. Power control beam 104 is then intercepted by light power sensor 102. Light power sensor 102 may be any conventional sensor. In the preferred embodiment of this invention, a solar cell is used. Light powder sensor 102 absorbs power control beam 104 and outputs a voltage signal on terminal 116. The voltage level of the signal on terminal 116 is proportional to the power contents of power control beam 104. The voltage signal on terminal 116 is fed into one leg of comparator amplifier means 118. Simultaneously, a reference voltage signal appears on terminal 120 and is fed into the other leg of comparative amplifier means 118. Comparative amplifier means 118 compares the two voltages and outputs an amplified voltage signal on terminal 122 when there is discrepancy between the input voltages on terminal 116 and 120, respectively. The voltage on terminal 122 may be positive or negative depending on the differences in the input voltages. The positive or negative voltage on terminal 122 is fed to D.C. motor 124. D.C. motor 124 is a conventional servo controlled motor. Therefore, if the voltage on terminal 122 is positive, D.C. motor 124, which is connected to rotor potentiometer means 126, will rotate the potentiometer means in one direction to thereby increase the resistance and hence the output voltage on terminal 128. Conversely, if the voltage on terminal 122 is negative, D.C. motor 124 will rotate the potentiometer means in the opposite direction to thereby decrease the effective resistance, and hence the output voltage on terminal 128. The voltage on terminal 128 is then fed via switch means 130, hereinafter called first switch means 130 to input terminal 112 of the modulator driver. Switch means 140 is controlled by the signal on terminal 142 from character generator 43 and the output rotary potentiometer 126 on terminal 128. As was mentioned previously, as the input voltage on terminal 112 changes so does the amplitude of the output signal on terminal 31 which, in turn, changes the power contents of utilization scanning beam 13.

In order to control the reference voltage on terminal 120, reference voltage control means 134 is set to a predetermined threshold level controlled value indicative of the power contents which is desired in beam 13 to scan the photoconductor.

In order to permit a change in the D.C. motor 124, only while scanning beam 13 is incident of the non-working area of the photoconductor, a second switch means 132 is positioned between the amplifier 118 and the D. C. motor 124.

Both first switch means 130 and second switch means 132 are conventional electromagnetic switches and are controlled (that is, close and/or open by a readjust command signal on terminal 136). In the preferred embodiment of the invention switches 130 and 132 are normally closed. However, as the leading lug pin, which defines the working area of the photoconductor, passes under the emitter wheel sensor a pulse is outputted from the sensor. This pulse is the readjust command which sets a latch (not shown). The output of the latch is connected to terminal 136. As long as the latch is on, the switches will be open and, therefore, inhibit any adjustment to the working beam. Similarly, as the trailing lug pins pass under the emitter wheel sensor, a pulse is outputted from the sensors. This pulse resets the latch and the switch returns to its normally closed position. As is evident from the above description, terminal 136 becomes active when scanning beam 13 is traversing the working area of photoconductor 11. As will be explained subsequently in the operational section of this application, the adjustment to the power contents of scanning beam 13 occurs in the time interval when the scanning beam 13 is traversing the nonworking area of the photoconductor.

During the time period when scanning beam 13 is traversing the working area of photoconductor 11 (FIGS. 1, 5 and 8) terminal 136 is active thereby opening switch means 130 and 132 and, therefore, rendering the adjustment features of the invention inactive. However, the previous voltage on terminal 128 remains constant during the time period when the adjustment feature is inactive. It should be noted that the previous voltage on terminal 128 was supplied by potentiometer means 126 prior to the opening of switch means 130 and 132. As such, whatever voltage was present on terminal 128 prior to the deactivation of the adjustment feature will remain constant when scanning beam 13 is traversing the working area of the photoconductor. The constant voltage on terminal 128 together with the output of character generator 43 on terminal 142 controls third switch means 140 to thereby place a signal on input terminal 112 indicative of the characters to be printed by utilization beam 13.

Figure 7:
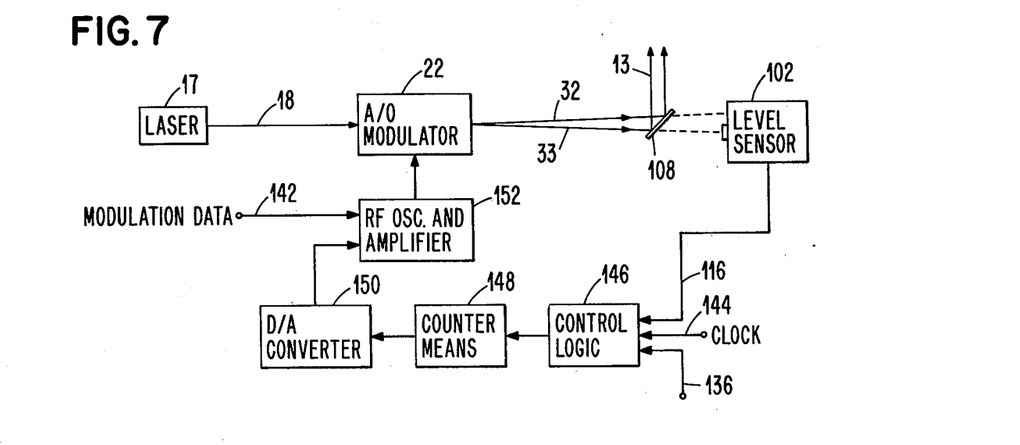
FIG. 7 shows an alternate digital embodiment of the adjustment circuitry.

Referring now to FIG. 7 an alternative embodiment of the invention is shown. The embodiment in FIG. 7 depicts digital implementation of the invention in block diagram form. As was explained previously, the characteristics of A/O modulator 22 is used to provide a semiautomatic feedback control for adjusting the power level of first order beam 33. As shown in FIG. 7, level power sensor 102, hereinafter called level sensor 102, containing threshold circuitry receives a portion of first order laser beam 33 at some point in the optical path between the A/O modulator and the image surface (that is, the photoconductor surface). The portion of the first order laser beam can be obtained by inserting semitransparent mirror 108 to split the first order beam. Level sensor 102 outputs a voltage signal on terminal 116 which indicates whether the power contents of first order beam 33 is above or below a preset desired level. The voltage level on terminal 116 together with a free running clock on terminal 144 and a controlled signal on terminal 136 is fed into control logic means 146. The output from control logic means 146 is then fed into counter means 148. The output from counter means 148 is converted to analog information via D-to-A (digital-to-analog) converter 150 and is used to drive R. F. oscillator and amplifier means 152. When the feedback loop is disabled, that is, when beam 13 is scanning the working area of photoconductor 11, then R.F. oscillator and amplifier means 152 is driven by modulation data on terminal 142. When terminal 136 is active, the signal resets counter means 148 to its first count, thus bringing the R.F. power of R.F. oscillator and amplifier means 152 to the A/O modulator to its initial condition. The clock on terminal 144, at a frequency to allow all transients to die out, increments counting means 148. The output from counting means 148 is then converted by D-to-A converter 150 which successively increases the R.F. power from R.F. oscillator and amplifier means 152 until level sensor 102 indicates that the laser intensity threshold has been reached. This power level is then held until the next period of adjustment resets counter means 148 initiating a new setup.

Although area 75 of the photoconductor (see FIGS. 5 and 8) has been defined above as the working area while area 74 (i.e., the area bordering the working area) has been defined as the nonworking area, this sectioning of the photoconductor should not be regarded as a limitation on the scope of this invention. The sectioning of the photoconductor was chosen because it is a simple conceptual approach for explaining the invention.

An alternative approach for defining working and nonworking areas is in terms of utilization scanning beam 13. With this approach, whenever utilization scanning beam 13 is on continuously or under the control of the power adjustment freature of the invention, the area of the photoconductor which is traversed by the utilization scanning beam is defined as the nonworking area. Conceptually, the nonworking area can extend or include working area 75, depending on whether or not utilization scanning beam 13 is on continuously or under the control of the power adjustment feature.

Conversely, the working area of the photoconductor is defined as the area of the photoconductor which is traversed by the utilization scanning beam when said beam is on selectively or when said beam is under the control of the character generator. With this definition, the working area of the photoconductor may extend into nonworking area 74.

By using the alternate approach in defining working and nonworking areas of the photoconductor in addition to the dynamic method, described above, for adjusting the power contents or power level of the working beam, the following methods are encompassed by the present invention.

Firstly, the invention covers the situations whereby the adjustment is made for a fixed period of time. For example, once per day or once per month or once every hour, etc., an operator activates and adjustment feature to bring the energy level of the working beam up to a predetermined level. That setting will be maintained until the next adjustment period. In this situation, the entire surface of the photoconductor which is traversed by the utilization scanning beam during the adjustment is the nonworking area of the photoconductor. The described situation also covers the case wherein the adjustment feature is activated at the beginning of a run. The above situations are called the start-up portion adjustment situation.

Secondly, the invention covers the situation wherein a specified number of copies are run or printed by utilization scanning beam 13 before the power adjustment feature is activated. This situation is referred to as batch run adjustment situation. This concludes the detailed description of the preferred embodiment of the invention.

OPERATION

One key element in the operation of this invention is obtaining an appropriate sampling interval such that adjustment to the power contents of the first order working beam can be made without affecting normal system performance. The time period chosen for said adjustment occurs when the beam is on for an extended time period. For example, when the beam is scanning the nonworking area of photoconductor 11, or when the beam is operating in the so called startup portion adjustment situation or when the beam is operating in the batch run adjustment situation.

Consider now the operation of the apparatus when it is in its print mode, in this case, command conductor 82 (FIG. 4) signals character generator 43 indicating not only that the apparatus is in the print mode, but also indicating the size copy papers, within which the content of page memory 42 is to be placed. Thus, the control of modulator 22 when in the print mode, is operable to erase the nonworking area 74 and 74' of photoconductor 11 (FIGS. 5 and 8), while working area 75 with its characters are selectively discharged. Consider, for example, scan 84 and scan 1 + N. These scans begin at point 85 with modulator 22 energized to produce the first order beam 33 continuously. Since the first order beam is on continuously, it serves to discharge or clean border area 74 of photoconductor 11.

During this time period when first order beam 33 is on continuously, beam splitting means 108 diverts a portion of said beam to light power sensor means 102. A voltage is outputted from light power sensor means 102 (FIG. 6) on terminal 116. This voltage is indicative of the power contents of first order beam 33. The voltage signal in terminal 116 is fed into one leg of comparator amplifier means 118. Simultaneously, a predetermined reference voltage is fed into comparative amplifier means 118. The value of the reference voltage is representative of the power contents which is necessary to discharge the surface of the photoconductor. A positive or negative voltage is outputted on terminal 122 from comparative amplifier means 118. This voltage in turn controls D.C. servo motor 124 which in turn increases or decreases the voltage input to input terminal 112 of modulator driver 110 via rotary potentiometer means 126. By changing the input voltage to modulator driver 110, the power contents, that is amplitude, of the output signal from modulator driver 110 on terminal 31 increases which in turn increases the power contents of first order beam 33. This adjustment to the power contents of beam 13 continues until the beam contacts reference corner 66 (FIG. 5) wherein a signal is outputted on terminal 136 indicating that the beam is now entering area 75 which is the working area of the photoconductor. The signal which controls terminal 136 is outputted from synchronizing means 90 as a result of the leading lug pin passing under the emitter wheel sensor. However, if the power contents of the beam reaches its predetermined value prior to contacting reference corner 66, then the output voltage from comparator amplifier means 118 will be approximately zero, and no further adjustment to the power contents of said beam will be initiated. From point 66 to the end of the working area the feedback power control path of the device is deactivated and modulator driver 110 is controlled by data stream generated on terminal 142 by character generator 43.

As the beam emerges from the working area (i.e., area 75), a signal is again outputted on terminal 136 from synchronizing means, indicating that the beam is now leaving the working area. Again the beam is on continuously and its energy contents are again adjusted in a manner similar to that described above.

For adjusting the beam during its scan of border area 74' (FIG. 5) the power control circuitry functions as is described above but terminal 136 is also controlled by pulses outputted from synchronizing means 37 and its associated elements.

Figure 9:
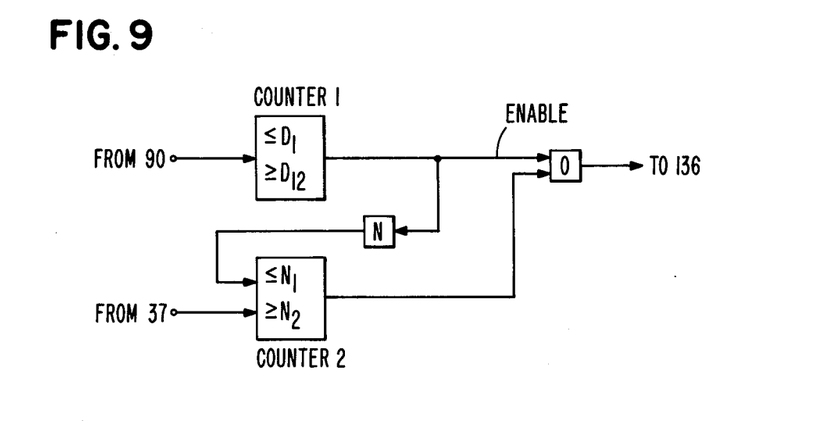
FIG. 9 shows an alternate scheme for determining working and nonworking areas on the photoconductor.

FIG. 9 shows an alternative scheme for determining working and nonworking areas on the photoconductor. If an LED/phototransistor package, together with an optical disc is the synchronizing device, then the number of disc counts which elapse for the drum to rotate through 85 (FIGS. 5 and 8) can be determined. Let the count be D1. Therefore, when the tach outputs a count less than or equal to D1, terminal 136 is inactive. During this period the output from synchronizing means 37 is made inactive via the inverter.

Let the count be D12 when the scanning beam is emerging from the working area 75. In order to determine that the beam is now scanning area 85' when the count from tachometer is equal to or greater than ($\geq$) D12 then the output from the OR circuit becomes active which in turn deactivates terminal 136 and power adjusting means is operable.

In a similar fashion by counting the pulses from sync clock 38, FIG. 4, one can determine when the scanning beam is about to enter working area 75 and when it is about to emerge from said working area. Let the count be N1 when the scanning beam is about to enter the working area 75 and N2 when the scanning beam is emerging from working area 75. Then, in order to determine that the scanning beam is traversing area 74' which precedes the entering of working area 75 the count fron sync means 37 must be less than or equal to N1. Likewise, to determine when the beam is scanning area 74' which follows the working area, the count from sync means 37 must be greater than or equal to N2. Counter 2, which determines when the beam is scanning area 74', is controlled by the fact that the beam is not scanning area 74. The output from counter 2 is then fed through OR circuit means to control terminal 136. This ends the operation of the device.

While the invention has been particularly shown and described with reference to the preferred embodiments thereof, it will be understood by those skilled in the art that various changes in form and details may be made therein without departing from the spirit and the scope of the invention.

What is claimed is:

1. In an electrophotographic apparatus wherein the photoconductor is continuously discharged in an area bordering a latent image area, and is selectively discharged in the latent image area in accordance with the image content of the latent image, the improvement comprising:
   radiant means to supply a beam of radiant power;
   means for intercepting said beam and for generating a first order working beam;
   means cooperating with said first order working beam and said photoconductor to cause said first order working beam to raster scan the photoconductor;
   detector means associated with said first order working beam and operable to detect the power content of said working beam;
   beam power control means controlled by said detector means and operable to maintain the power content of said beam adjusted to a reference level; and
   synchronizing means controlled by the angular position of said photoconductor, and operable to enable adjustment of the beam's power content only when the beam is continuously discharging the photoconductor's border area.

2. The apparatus defined in claim 1 wherein the radiant means is a monochromatic light source.

3. The apparatus as defined in claim 1 wherein said means cooperating with said beam includes an acousto-optic modulator being operable when energized to deflect said beam from an undeflected zero order path to a deflected first order path, only said first order path being incident upon said photoconductor; and
   modulator control means operable to cause said first order path to be continuously generated when scanning the photoconductor's border area to thereby erase said border area and to cause said first order path to be selectively generated when scanning the photoconductor's image area.

4. The apparatus defined in claim 3 wherein said modulator control means includes data means operable to selectively energize said modulator in time relationship with the point of incidence of said first order beam and said photoconductor, so as to continuously energize said modulator when said point of incidence is in the photoconductor's border area, and to selectively energize said modulator when said point of incidence is in the photoconductor's image area.

5. The apparatus defined in claim 1 wherein said detector means includes beamsplitting means and level sensor means and wherein said synchronizing means is operable to enable said detector means only when said first order beam is being incident upon the photoconductor's border area.

6. The apparatus defined in claim 1 wherein said synchronizing means includes means operable to enable said beam control means only when said point of incidence of said first order beam is in the photoconductor's border area.

7. In an electrophotographic apparatus wherein the photoconductor is continuously discharged in an area bordering a latent image area, and is selectively discharged in the latent image area in accordance with the image content of the latent image, the improvement comprising in combination:
   radiant means to supply a beam of radiant power;
   scanning means operably associated with the photoconductor and said beam to cause said beam to raster scan both the border and the image area of the photoconductor;
   detector means associated with said scanning beam and operable to detect the power contents of said beam;
   power control means operably associated with said detector means for adjusting the power contents of said scanning beam so as to conform with a predetermined power level;
   data control means for controlling the beam during operation within the latent image area;
   synchronizing means operable for enabling the data control means in accordance with the point of incidence of the beam within the latent image area of the photoconductor and operable for enabling the power control means to adjust the beam's power level when the beam is positioned outside of the latent image area.

8. In a xerographic device having a photoconductor with working and nonworking areas having a light source to supply a beam of radiant power wherein said beam of radiant power is being intercepted by an acousto-optic modulator thereby dividing said beam into a zero order path and a first order path wherein the first order path beam is used to scan the photoconductor, the improvement in combination comprising:
   beam splitter means positioned down stream next to the acousto-optic modulator and along the scanning path of the first order beam to divert the beam along a utilization scanning path and a feedback control path;
   detector means operably positioned along the feedback control path to sense the power contents of said beam;
   modulator switching means operable to drive said acousto-optic modulator;
   power control means operably associated with said modulator switching means, said power control means being controlled to maintain the power contents of said first order beam adjusted to a predetermined value during scanning of the photoconductor nonworking area; and
   data control means operably associated with said modulator switching means to control the first order beam during scanning of the photoconductor working area.

9. A method for maintaining, at constant level, the power contents of a beam which selectively and/or continuously discharges a photoconductor, comprising the steps of:
   (a) splitting the beam into zero order and a first order component;
   (b) sensing the power contents of the first order component during the time period when the photoconductor is continuously discharging;
   (c) comparing the power contents of said first order component with a standard reference value; and
   (d) adjusting the power contents of said first order component if the power contents of said first order component differs from the reference value during the time intervalve when said first order component is continuously discharging the photoconductor.

10. The method as claimed in claim 9 wherein the power in the first order component is adjusted only when the first order beam is continuously discharging said photoconductor.

11. In an electrophotograpic printer wherein a laser beam is being utilized to print a latent image onto the working area of the photoconductor of the printer, said beam being on selectively while traversing the working area of said photoconductor and on continuously while traversing the nonworking area of said photoconductor, an improved method to maintain control of the power level of said beam comprising the following steps:
 (a) splitting the laser beam into a utilization scanning beam and a feedback control beam;
 (b) sensing the power contents of said feedback control beam during the time period when said utilization beam is scanning the nonworking area of said photoconductor;
 (c) comparing the sensed power contents with a standard predetermined value; and
 (d) adjusting the power contents of said utilization scanning beam when the power contents of said feedback control beam falls below the standard predetermined value.

12. The method as claimed in claim 11 wherein the adjustment occurs during the time period when the beam is on continuously and is scanning the nonworking area of the photoconductor.

13. The method as claimed in claim 12 further including the steps of disabling the adjustment operation when the beam is on selectively to scan the working area of said photoconductor.

14. In an electrophotographic printer wherein the photoconductor is being scanned by a first order light beam, the improvement comprising in combination;
 means for supplying the first order light beam;
 power adjustment means operably associated with said first order light beam for adjusting the power level of said beam to a predetermined value;
 said power adjustment being operable only when the light beam is on continuously.

15. The apparatus as described in claim 14 further including means to inhibit the power adjustment means when the light beam is on selectively.

16. In an electrophotographic apparatus having a conventional electrophotographic drum rotatably mounted on a support shaft with the usual charging station, exposing station, development station, fusing station and cleaning station the improvement comprising in combination:
 a light source for supplying a monochromatic light beam;
 a modulator means to intercept said light beam and breaking it up into zero order and working order light beam;
 scanning means associated with said working order beam and operable to direct the working order beam so as to scan the surface of the photoconductor;
 means for intercepting the working beam and generating a feedback power controlled path;
 sensing means associated with said working order beam and operable to sense and output a signal indicating the power contents of said working beam;
 power adjustment means, associated with the power controlled path, being operable to adjust the power contents of said working order beam; and
 means for monitoring the angular position of the photoconductor, so as to determine the point of incident of said working order beam, and to activate the power adjustment means when said working beam is scanning a nonworking area of said photoconductor.

* * * * *